United States Patent [19]

Hirose et al.

[11] Patent Number: 5,614,099

[45] Date of Patent: Mar. 25, 1997

[54] HIGHLY PERMEABLE COMPOSITE REVERSE OSMOSIS MEMBRANE, METHOD OF PRODUCING THE SAME, AND METHOD OF USING THE SAME

[75] Inventors: Masahiko Hirose; Hiroki Ito, both of Shiga; Masatoshi Maeda, Osaka; Kazuo Tanaka, Shiga, all of Japan

[73] Assignee: Nitto Denko Corporation, Japan

[21] Appl. No.: 572,900

[22] Filed: Dec. 18, 1995

[30] Foreign Application Priority Data

| Dec. 22, 1994 | [JP] | Japan | 6-319717 |
| Dec. 22, 1994 | [JP] | Japan | 6-319718 |
| Jul. 13, 1995 | [JP] | Japan | 7-177455 |
| Jul. 18, 1995 | [JP] | Japan | 7-181186 |

[51] Int. Cl.$^6$ ................................. B01D 61/00
[52] U.S. Cl. .................... 210/653; 210/641; 210/652; 210/500.37; 210/500.38; 210/490
[58] Field of Search ......................... 210/490, 500.37, 210/500.38, 500.41, 653, 652, 500.21, 500.27, 641

[56] References Cited

U.S. PATENT DOCUMENTS

| 4,262,041 | 4/1981 | Eguchi et al. | 210/506 |
| 4,277,344 | 7/1981 | Cadotte | 210/654 |
| 4,337,154 | 6/1982 | Fukuchi et al. | 210/490 |
| 4,360,434 | 11/1982 | Kawaguchi et al. | 210/638 |
| 4,520,044 | 5/1985 | Sundet | 427/244 |
| 4,707,265 | 11/1987 | Barnes, Jr. et al. | 210/490 |
| 4,872,984 | 10/1989 | Tomaschke | 210/500.38 |
| 5,015,382 | 5/1991 | Sundet | 210/490 |
| 5,051,178 | 9/1991 | Uremura et al. | 210/500.38 |
| 5,069,945 | 12/1991 | Wradsilo | 210/500.37 |
| 5,152,901 | 10/1992 | Hogdon | 210/490 |
| 5,234,598 | 8/1993 | Tran et al. | 210/490 |

FOREIGN PATENT DOCUMENTS

| 62-121603 | 6/1987 | Japan . |
| 62-266103 | 11/1987 | Japan . |
| 63-012310 | 1/1988 | Japan . |
| 63-218208 | 9/1988 | Japan . |
| 8402648 | 3/1986 | Netherlands | 210/500.38 |

Primary Examiner—Ana Fortuna
Attorney, Agent, or Firm—Merchant, Gould, Smith, Edell, Welter & Schmidt

[57] ABSTRACT

This invention provides a composite reverse osmosis membrane having a polyamide type skin layer whose average surface roughness is at least 55 nm, and the polyamide type skin layer comprises the reaction product of a compound having amino groups and polyfunctional acid halide compound having acid halide groups. The composite reverse osmosis membrane of this invention is superior in salt rejection and water permeability. A polymer film is formed on a supporting film by contacting a solution containing e.g., m-phenylenediamine with a porous polysulfone supporting film so as to form a layer of the solution on the supporting film, then contacting the film with a solution of trimesic acid chloride and holding the film in a hot air dryer so that a polymer film is formed on the supporting film. The surface of the polyamide type skin layer can also be treated with quaternary ammonium salt and coated with a crosslinked layer of an organic polymer having positively-charged groups. Raw liquid is transmitted from a raw liquid tank to a membrane module for the first stage through a first transmission pump, and the first stage of reverse osmosis treatment is carried out. The composite reverse osmosis membrane coated with the crosslinked layer is used when another reverse osmosis treatment is carried out by using another membrane module for the second stage.

14 Claims, 1 Drawing Sheet

FIG. 1

HIGHLY PERMEABLE COMPOSITE REVERSE OSMOSIS MEMBRANE, METHOD OF PRODUCING THE SAME, AND METHOD OF USING THE SAME

FIELD OF THE INVENTION

This invention relates to a composite reverse osmosis membrane for selectively separating the components of a liquid mixture. More specifically, this invention relates to a composite reverse osmosis membrane which is used for desalination of low-concentration mineral salts and for removing cationic organic materials in the process of preparing ultra-pure water which is necessary to manufacture semiconductors. This invention further relates to a composite reverse osmosis membrane by which purer water can be obtained or a waste liquid can be withdrawn under an energy-saving low-pressure operation. The composite reverse osmosis membrane of this invention can be also used for condensing active principles for foods.

BACKGROUND OF THE INVENTION

Several composite reverse osmosis membranes have been proposed, and such a conventional composite reverse osmosis membrane is produced by forming a thin film having a substantially selective separability on a porous support. This reverse osmosis membrane has a different structure from that of an asymmetric reverse osmosis membrane.

Several composite reverse osmosis membranes, each having been formed on a support as a thin film comprising a polyamide obtained by an interfacial polymerization of a polyfunctional aromatic amine and polyfunctional aromatic acid halide, are disclosed in e.g., JP-A-55-147106, JP-A-62-121603, JP-A-63-218208, and JP-A-2-187135. The term "JP-A" means an "unexamined published Japanese patent application". Other prior art references disclose composite reverse osmosis membranes wherein thin films comprising polyamide are formed on supports, and the polyamide is obtained by an interfacial polymerization of polyfunctional aromatic amine and polyfunctional alicyclic acid halide, for example, JP-A-61-42308. In general, an activated layer of a composite reverse osmosis membrane comprises crosslinked polyamide, since it can be easily produced. Such an activated layer has negative fixed charge groups. As a result, the anion removal rate is high but the cation removal rate is low in a high pH region when a desalination of mineral salts is conducted in a low-concentration region. Therefore, the overall performance of the membrane is decreased. In order to solve such problems, a composite reverse osmosis membrane wherein an activated layer is coated with organic polymers having positive fixed charge groups is disclosed in JP-A-62-266103.

The composite reverse osmosis membranes described above have a high desalination performance and a high water permeability, but it has further been desired for those membranes to improve the water permeability while keeping the high desalination performance from the standpoint of the efficiency. For these requirements, various kinds of additives are proposed e.g., in JP-A-63-12310. However, in the conventional composite reverse osmosis membranes, the improvement of the water permeability is still insufficient even where these additives are used, and a composite reverse osmosis membrane having a higher water permeability has been desired. The composite osmosis membrane disclosed in JP-A-62-266103 is manufactured to function as an adsorptive film. Thus the predetermined efficiency will be deteriorated because of some degrees of loss of the film after the membrane is used repeatedly. This membrane is especially inadequate for a second membrane to be used in a two-stage reverse osmosis treatment conducted before preparing ultra-pure water for manufacturing semiconductors. In this newly-developed treatment, a negatively-charged membrane having high desalination is used in the first stage, and the permeated liquid is supplied for the second stage. Thus, the desalination efficiency is deteriorated if the two membranes have the same performance. In addition, the membranes are coated with crosslinked layers of organic polymers having positively fixed charged groups, so the permeation flux is deteriorated. It is an economical disadvantage, so a membrane with high permeation flux is needed.

SUMMARY OF THE INVENTION

It is an object of this invention to solve the abovementioned problems by providing a composite reverse osmosis membrane that has a high salt rejection and a high water permeability. Another object of this invention is to provide a composite reverse osmosis membrane that is superior in desalination of mineral salts in a lower concentration region and removal of cationic organic materials while keeping a high water permeability.

In order to accomplish these and other objects and advantages, a first highly permeable composite reverse osmosis membrane of this invention comprises a thin film as a polyamide type skin layer comprising a reaction product of a compound having at least two reactive amino groups and a polyfunctional acid halide compound having at least two reactive acid halide groups. This composite reverse osmosis membrane also comprises a porous support to support the thin film. The average surface roughness of the polyamide type skin layer on the composite reverse osmosis membrane is at least 55 nm. It is preferable that the average surface roughness of the polyamide type skin layer on the composite reverse osmosis membrane is 10,000 nm or less, and more preferably, not more than 1,000 nm.

It is preferable that the square average surface roughness of the polyamide type skin layer on the composite reverse osmosis membrane is at least 65 nm. It is preferable that the square average surface roughness of the polyamide type skin layer on the composite reverse osmosis membrane is not more than 20,000 nm, and more preferably, not more than 2,000 nm.

It is also preferable that the ten-points average surface roughness of the polyamide type skin layer on the composite reverse osmosis membrane is at least 300 nm. It is preferable that the ten-points average surface roughness of the polyamide type skin layer on the composite reverse osmosis membrane is not more than 50,000 nm, and more preferably, not more than 10,000 nm.

It is further preferable that the difference between peak and valley of the polyamide type skin layer on the composite reverse osmosis membrane is at least 400 nm. It is preferable that the difference between peak and valley of the polyamide type skin layer on the composite reverse osmosis membrane is not more than 100,000 nm, and more preferably, not more than 20,000 nm.

Next, a second highly permeable composite reverse osmosis membrane of this invention comprises a thin film and a porous support to support the thin film. The thin film is a negatively-charged crosslinked polyamide type skin layer which comprises a reaction product of a compound having at least two reactive amino groups and a polyfunctional acid halide compound having at least two reactive acid halide groups. The average surface-roughness of the skin layer is at least 55 nm. It is preferable that the average surface roughness of the polyamide type skin layer on the composite reverse osmosis membrane is 60–10,000 nm, and more preferably, not more than 1,000 nm. It will be difficult to obtain a sufficient permeation flux outside of this range. In addition, the skin layer is coated with a crosslinked layer of organic polymers having positively-charged groups.

It is preferable that the square average surface roughness of the polyamide type skin layer on the composite reverse osmosis membrane is at least 65 nm. It is preferable that the square average surface roughness of the polyamide type skin layer on the composite reverse osmosis membrane is 70–20,000 nm, or more preferably, not more than 2,000 nm. It will be difficult to obtain a sufficient permeation flux outside of this range.

It is also preferable that the ten-points average surface roughness of the polyamide type skin layer on the composite reverse osmosis membrane is at least 300 nm. It is preferable that the ten-points average surface roughness of the polyamide type skin layer of the composite reverse osmosis membrane is 305–50,000 nm, and more preferably, not more than 10,000 nm. It will be difficult to obtain a sufficient permeation flux outside of this range.

It is further preferable that the difference between peak and valley of the polyamide type skin layer on the composite reverse osmosis membrane is at least 400 nm. It is preferable that the difference between peak and valley of the polyamide type skin layer on the composite reverse osmosis membrane is 410–100,000 nm, or more preferably, not more than 20,000 nm. It will be difficult to obtain a sufficient permeation flux outside of this range.

The average surface roughness is defined by the following Numerical Formula 1.

Numerical Formula 1 average surface roughness: Ra $$Ra = \frac{1}{S} \int_0^a \int_0^b |f(x,y) - z_0| dx dy$$

The square average surface roughness is defined by the following Numerical Formula 2.

Numerical Formula 2 square average surface roughness: Rms $$Rms = \left[ \frac{1}{S} \int_0^a \int_0^b \{f(x,y) - z_0\}^2 dx dy \right]^{1/2}$$

The ten-points average surface roughness is defined by the following Numerical Formula 3.

Numerical Formula 3 ten-points average surface roughness: Rz difference between the average values of peaks from the highest to the second highest among 10 points and the average values of valleys from the lowest to the second lowest among 10 points.

The maximum difference between peak and valley is defined by the following Numerical Formula 4.

Numerical Formula 4 maximum difference between peak and valley: PV $PV = z_{max} - z_{min}$ a,b: the length of two sides of the specified (rectangular) face S: the area of the specified face f(x, y): height in the specified face $z_0$: the average value of the height in the specified face $$z_0 = \frac{1}{S} \int_0^a \int_0^b f(x,y) dx dy$$

$z_{max}$: elevation of the highest peak in the specified face $z_{min}$: elevation of the lowest valley The average surface roughness, square average surface roughness, ten-points average surface roughness and the maximum difference between peak and valley are generally found by the means to find surface roughness.

Not only can the examples like the atomic force microscope (AFM), friction force microscope (FFM), non-contact atomic force microscope (NC-AFM), tunnel microscope (STM), electrochemical-atomic force microscope (EC-AFM), scanning electron microscope (SEM, FE-SEM), and transmission electron microscope (TEM), be used, but also any other means can be adopted to find surface roughness.

In the second embodiment of this invention, the surface of the negatively-charged crosslinked polyamide type skin layer should be coated with a crosslinked layer of organic polymers having positively-charged groups. Otherwise, desalination of the low concentration mineral salts or removal of cationic organic materials cannot be conducted sufficiently.

Here, polyethyleneimine is an example of the organic polymers having positively-charged groups. A crosslinked layer of this invention is made by coating an activated layer. For the present purpose, the organic polymers having positively-charged groups are crosslinked with a crosslinking agent. Among the crosslinking agents are included glyoxal and glutaraldehyde, and glutaraldehyde is preferably used in the light of the molecular weight. In other words, it is preferable that the crosslinked layer of the organic polymers having positively-charged groups is that of organic polymers with crosslinked polyethyleneimine.

The crosslinked layer also can comprise organic polymers having positively-charged groups made by crosslinking polymers having quaternary ammonium groups and hydroxyl groups, and the crosslinking means one selected from the group consisting of intramolecular link and intermolecular link.

It is preferable that the crosslinked layer of organic polymers having positively-charged groups is 1 NM–10 NM thick.

Though the means for coating the activated layer with a crosslinked layer is not limited, the following means are taken as examples:

coating or dipping an activated layer with an aqueous solution of organic polymers having positively-charged groups, and crosslinking it by using a crosslinking agent;

adding organic polymers having positively-charged groups to the raw water while conducting reverse osmosis treatment, and adding crosslinking agent in the same manner after washing step. In this case, the concentration of organic polymers having positively-charged groups is generally 0.1–10 wt % (weight percent), and preferably, 1–5 wt %. The concentration of the crosslinking agent is generally 0.01–10 wt%, and preferably, 0.1–5 wt%.

According to this invention, organic polymers having positively-charged groups are coated on a negatively-charged activated layer, and the organic polymers are crosslinked. Namely, the organic polymers are three-dimensionally crosslinked in addition to the adsorption structure. As a result, the organic polymers having positively-charged groups hardly drop out compared to the conventional polymers without crosslinking, even after the composite semipermeable membrane is repeatedly used. Therefore, the properties are not deteriorated.

The invention provides a method of producing a highly permeable composite reverse osmosis membrane by forming a negatively-charged crosslinked polyamide type skin layer whose surface is coated with a crosslinked layer of organic polymers having positive fixed charge groups. The polyamide type skin layer is formed by coating its porous support with a solution A containing a compound having at least to reactive amino groups, and then contacting the layer of the solution A with another solution B containing polyfunctional acid halide. And at least one of the elements selected from the group consisting of solution A, solution B, and the porous support has a compound having a solubility parameter of $8-14(cal/cm^3)^{1/2}$.

It is preferable that the compound having a solubility parameter of 8–14 $(cal/cm^3)^{1/2}$ is an alcohol.

It is also preferable that the compound having a solubility parameter of 8–14 $(cal/cm^3)^{1/2}$ is an ether.

It is also preferable that the crosslinked layer comprises organic polymers having positively-charged groups and the organic polymers are made by crosslinking polymers having quaternary ammonium groups and hydroxyl groups, and the crosslinking is at least one means selected from the group consisting of intramolecular link and intermolecular link.

This invention also provides a method of removing materials from a liquid, and the method comprises subjecting the liquid to treatment with a plurality of reverse osmosis membranes. According to this method, a highly permeable reverse osmosis membrane comprising a negatively-charged crosslinked polyamide type skin layer and a porous support for the skin layer is used for a treatment of the liquid other than the first treatment. The skin layer comprises a reaction product of a compound having at least two reactive amino groups and a polyfunctional acid halide compound having at least two reactive acid halide groups and has an average surface roughness of at least 55 nm. The skin layer is coated with a crosslinked layer of an organic polymer having positively-charged groups.

It is preferable that a treatment prior to the treatment with the highly permeable reverse osmosis membrane is carried out using a reverse osmosis membrane comprising a negatively-charged crosslinked polyamide type skin layer and a porous support for the skin layer. The skin layer comprises a reaction product of a compound having at least two reactive amino groups and a polyfunctional acid halide compound having at least two acid halide groups.

It is also preferable the skin layer of the reverse osmosis membrane used for the treatment prior to the treatment with the highly permeable reverse osmosis membrane has an average surface roughness of at least 55 nm.

The composite reverse osmosis membrane of this invention is produced by adding at least one compound having a solubility parameter of 8–14 $(cal/cm^3)^{1/2}$ selected from the group consisting of alcohols, ethers, ketones, esters, halogenated hydrocarbons, and sulfur-containing compounds when, for instance, a compound having at least two reactive amino groups and a polyfunctional acid halide compound having at least two reactive acid halide groups react and the reaction is an interfacial polycondensation. The alcohols include, for example, ethanol, propanol, butanol, butyl alcohol, 1-pentanol, 2-pentanol, t-amyl alcohol, isoamyl alcohol, isobutyl alcohol, isopropyl alcohol, undecanol, 2-ethyl butanol, 2-ethyl hexanol, octanol, cyclohexanol, tetrahydro furfuryl alcohol, neopentyl glycol, t-butanol, benzyl alcohol, 4-methyl-2-pentanol, 3-methyl-2-butanol, pentyl alcohol, allyl alcohol, ethylene glycol, diethylene glycol, triethylene glycol, and tetraethylene glycol.

The ethers include, for example, anisole, ethyl isoamyl ether, ethyl-t-butyl ether, ethylbenzyl ether, crown ether, cresyl metyl ether, diisoamyl ether, diisopropyl ether, diethyl ether, dioxane, diglycidyl ether, cineol, diphenyl ether, dibutyl ether, dipropyl ether, dibenzyl ether, dimethyl ether, tetrahydropyran, tetrahydrofuran, trioxane, dichloroethyl ether, butyl phenyl ether, furan, methyl-t-butyl ether, monodichloFodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diethyl ether, diethylene glycol dibutyl ether, diethylene glycol monomethyl ether, diethylene glycol monoethyl ether, diethylene glycol monobutyl ether, and diethylene chlorohydrin.

The ketones include, for example, ethyl butyl ketone, diacetone alcohol, diisobutyl ketone, cyclohexanone, 2-heptanone, methyl isobutyl ketone, methyl ethyl ketone, and methyl cyclohexane.

The esters include, for example, methyl formate, ethyl formate, propyl formate, butyl formate, isobutyl formate, isoamyl formate, methyl acetate, ethyl acetate, propyl acetate, butyl acetate, isobutyl acetate, and amyl acetate. The halogenated hydrocarbons include, for example, allyl chloride, amyl chloride, dichloromethane, and dichloroethane.

The sulfur-containing compounds include, for example, dimethyl sulfoxide, sulfolane, and thiolane. Among these compounds, alcohols and ethers are especially preferable. These compounds can be used either independently or plurally.

According to the first embodiment of this invention, the composite reverse osmosis membrane comprises a thin film of a polyamide type skin layer comprising a reaction product of a compound having at least two reactive amino groups and a polyfunctional acid halide compound having at least two reactive acid halide groups. The composite reverse osmosis membrane of this invention also comprises a porous support to support the thin film. When the average surface roughness of the polyamide type skin layer of the composite reverse osmosis membrane is at least 55 nm, both salt rejection and water-permeability are improved, because the area of the skin layer to effectively separate substances like salt increases by enlarging the surface roughness of the membrane. Thus the water permeability can be improved without sacrificing the salt rejection.

In this invention, the surface roughness should be at least 55 nm. Sufficient permeation flux cannot be attained if the surface roughness is below 55 nm. It is more preferable that the average surface roughness is at least 60 nm.

And it is preferable that the square average surface roughness is at least 65 nm, because sufficient permeation flux cannot be attained if the square average surface roughness is below 65 nm. It is more preferable that the square average surface roughness is at least 70 nm.

And it is preferable that the ten-points average surface roughness is at least 300 nm, because sufficient permeation flux cannot be attained if the ten-points average surface roughness is below 300 nm. It is more preferable that the ten-points average surface roughness is at least 305 nm.

And it is preferable that the maximum difference between peak and valley is at least 400 nm, because sufficient permeation flux cannot be attained if the maximum difference between peak and valley is below 400 nm. It is more preferable that the maximum difference between peak and valley is at least 410 nm.

The close relation between permeation flux and surface roughness of a composite reverse osmosis membrane was found out, and the discovery resulted in this invention.

The amine component used in this invention is not limited as long as the amine component is a polyfunctional amine having at least two reactive amino groups, for example, aromatic, aliphatic, and allcyclic polyfunctional amines.

The examples of the aromatic polyfunctional amines are, m-phenylenediamine, p-phenylenediamine, 1,3,5-triaminobenzene, 1,2,4-triaminobenzene, 8,5-diaminobenzoic acid, 2,4-diaminotoluene, 2,4-diaminoanisole, amidol, and xylylenediamine. The examples of the aliphatic polyfunctional amines are ethylenediamine, propylenediamine, and tris(2-aminoethyl)amine. And the examples of the allcyclic polyfunctional amines are, 1,3-diaminocyclohexane, 1,4-diaminocyclohexane, piperazine, 2,5-dimethylpiperazine, and 4-aminomethylpiperazine. Those amines can be used alone or as mixtures thereof.

The polyfunctional acid halide used in this invention is not particularly limited, and the examples include aromatic, aliphatic, and alicyclic polyfunctional acid halides.

The examples of the aromatic polyfunctional acid halides are trimesic acid chloride, terephthalic acid chloride, isophthalic acid chloride, biphenyldicarboxylic acid chloride, naphthalenedicarboxylic acid chloride, benzene trisulfonic acid chloride, benzene disulfonic acid chloride, and chlorosulfonium benzene dicarboxylic acid chloride.

The examples of the aliphatic polyfunctional acid halides are propanetricarboxylic acid chloride, butanetricarboxylic acid chloride, pentanetricarboxylic acid chloride, glutaryl halide, and adipoyl halide.

The examples of the alicyclic polyfunctional acid halides are cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride.

According to this invention, a composite reverse osmosis membrane having a thin film comprising a crosslinked polyamide as the main component on a porous support is obtained by interfacial polymerization of the above-described amine component and the above-described acid halide component.

The porous support for supporting the thin film described above is not particularly limited as long as the support can support the thin film, and the examples are polysulfone, polyaryl ether sulfones such as polyether sulfone, polyimide and polyvinylidene fluoride. A porous support comprising polysulfone or polyaryl ether sulfone is especially preferable because it is stable chemically, mechanically and thermally. Such a porous support is usually about 25 to 125 μm thick, and preferably, about 40 to 75 μm thick, but the thickness is not necessarily limited to those ranges.

In more detail, the composite reverse osmosis membrane can be obtained by forming a first layer comprising the solution containing the amine component on the porous support, forming a second layer comprising the solution containing the acid halide component on the first layer, and then carrying out the interfacial polycondensation to form a thin film comprising a crosslinked polyamide on the porous support.

The solution containing the polyfunctional amine can contain a small amount of a polymer such as polyvinyl alcohol, polyvinyl pyrrolidone, polyacrylic acid, and/or a polyhydric alcohol such as sorbitol, glycerol, in order to facilitate the film formation and improve the performance of the composite reverse osmosis membranes.

It is also possible to add a compound with a solubility parameter of 8–14 $(cal/cm^3)^{1/2}$ to a solution containing the polyfunctional amine and/or acid halide component so that the permeation flux improves.

The amine salts described in JP-A-2-187135, such as a salt of a tetraalkylammonium halide or a trialkylamine and an organic acid can also be suitably used for the solution to facilitate the film formation, improve the adsorption of the amine solution in the support, and accelerate the condensation reaction.

The solution can further contain a surfactant such as sodium dodecylbenzenesulfonate, sodium dodecylsulfonate, and sodium laurylsulfonate. Such a surfactant has an effect for improving the wettability of the solution containing the polyfunctional amine for the porous support.

Furthermore, for accelerating the polycondensation reaction at the interface, it is effective to use sodium hydroxide or sodium tertiary phosphate capable of removing a hydrogen halide formed by the interfacial reaction or to use an acylation catalyst as a catalyst.

The concentration of the acid halide and the concentration of the polyfunctional amine are not particularly limited to the solution containing the acid halide and also the solution containing the polyfunctional amine described above, but the concentration of the acid halide is usually from 0.01 to 5 wt %, and preferably from 0.05 to 1 wt %, and the concentration of the polyfunctional amine is usually from 0.1 to 10 wt %, and preferably, from 0.5 to 5 wt %.

The porous support is coated with the solution containing polyfunctional amine, then the solution containing polyfunctional acid halide compound is coated thereon. After the extra solutions are removed, the coated layers are heated and dried, usually at about 20° to 150°, preferably about 70° to 130° C., for about 1 to 10 minutes, preferably about 2 to 8 minutes, so that a water permeable thin film of crosslinked polyamide is formed. The thin film is usually 0.05 to 1 μm thick, and preferably, about 0.15 to 0.5 μm thick.

In the production method of the composite reverse osmosis membrane of this invention, the salt rejection performance can be further improved by applying thereto a chlorine treatment with hypochlorous acid etc., as described in JP-B-63-36809. The term "JPB" means an "examined published Japanese patent application".

As mentioned above, the composite reverse osmosis membrane of the first embodiment of this invention has high salt rejection and high permeability and enables effective desalination under comparatively low pressure. Therefore, the composite reverse osmosis membrane can be used for several purposes like desalination of brine, production of ultra-pure water needed for the semiconductor industry, removal of contaminating sources and recovering effective materials from a contaminated liquid or water, and condensation of active principles for foods.

The composite reverse osmosis membrane of the second embodiment of this invention comprises a negatively-charged crosslinked polyamide type skin layer comprising a reaction product of a compound having at least two reactive amino groups and a polyfunctional acid halide compound having at least two reactive acid halide groups. The average surface roughness of the skin layer is at least 55 nm. And the skin layer is coated with a crosslinked layer of organic compounds having positively-charged groups, so that the composite reverse osmosis membrane is superior in desalination of mineral salts in a low-concentration area and in removal of cationic organic materials, without sacrificing high water permeability. In other words, the close relation between the permeation flux and the composite reverse osmosis membrane was discovered, and the surface roughness of the base film was controlled. Therefore, it was found that the sufficiently high permeation flux can be obtained even if a positively-charged layer is formed. In this embodiment, the skin layer was coated with a crosslinked layer of organic polymer having positively-charged groups. Except for this, the steps are identical to those of the first embodiment. In this invention, the surface of the negatively-charged crosslinked polyamide type skin layer should be coated with a crosslinked layer of organic polymers having positively-charged groups, so that the desalination of low concentration mineral salts and removal of cationic organic materials can be conducted more efficiently.

A composite reverse osmosis membrane used in this invention has a negatively-charged polyamide type skin layer which is coated with a crosslinked layer of organic polymers having positively-charged groups. The structure of the organic polymers is not particularly limited.

However, it is favorable in this invention that the organic polymers are soluble in a solvent in view of the processability and workability. Therefore, it is preferable that the organic polymers are crosslinked three-dimensionally after they are coated on a composite reverse osmosis membrane. For such purposes, organic polymers which have positively-charged groups and polyfunctional groups to cause crosslinking reaction in the molecules are used. And the organic polymers is soluble in a solvent. For example, polymers A and B can be used. Polymer A has not only positively-charged groups but also at least two hydroxylic groups and/or amino groups in the molecules. Polymer B has not only positively-charged groups but also at least two hydroxylic groups and/or amino groups and in addition, two protected isocyanate groups.

The positively-charged groups include ammonium groups, phosphonium groups, and sulfonium groups. The protected isocyanate groups are isocyanate groups blocked by using a blocking agent, or isocyanate groups protected in the form of amineimide groups.

Various blocking agents for blocking isocyanate groups are known. The examples are the phenol family including phenol and cresol, the alcohol family including methanol, ethanol and methyl cellosolve, and the oxime family including methyl ethyl ketoxime and acetaldehyde oxime.

The polymer A includes a homopolymer of hydroxypropyl methacrylate trimethyl ammonium chloride and its copolymer with another polymerizable monomer, a copolymer of ethyl methacrylate trimethyl ammonium chloride and hydoroxyethyl methacrylate, and a quaternary copolymer of 4-vinylpyridine and hydroxyethyl methacrylate.

The polymer B includes a copolymer of hydroxypropyl methacrylate trimethylammonium chloride and an isocyanate monomer formed by blocking 2-methacryloyl oxyethylene isocyanate with a proper quantity of blocking agent, a quaternary compound of the copolymer of the blocked isocyanate and 4-vinylpyridine and hydroxyethyl methacrylate, and a copolymer of hydroxypropyl methacrylate trimethyl ammonium chloride and a vinyl monomer having amineimide groups like 1,1-dimethyl-1-(2-hydroxypropyl)amine methacryl imide.

Both of the polymers A and B are soluble in water and alcohol. Therefore, a crosslinked polymer layer of this invention can be formed on a skin layer of a composite reverse osmosis membrane by several methods as follows.

A crosslinked polymer layer is formed by coating a water solution or alcohol solution of polymer A on a composite reverse osmosis membrane, drying the membrane, contacting the membrane with a solution in which a polyisocyanate compound as a polyfunctional crosslinking agent is dissolved, and crosslinking the copolymer A molecules by heating if necessary.

Or the crosslinked polymer layer is formed by preparing an aqueous solution or alcohol solution of the polymer A by adding the polyfunctional isocyanate compound blocked with the blocking agent, coating the solution on a composite reverse osmosis membrane, and healing to the dissociation temperature of the blocked polyisocyanate or above so that the polyisocyanate compound will be freed and crosslinked with the polymer A.

The polyisocyanate compound is not particularly limited. The examples are tolylenediisocyanate, diphenylmethanediisocyanate, or the polymer of these substances, isophoronediisocyanate, hexamethylenediisocyanate, triphenylmethanetriisocyanate, tris(p-isocyanatephenyl)thiophosfate, an addition polymer of trimethylol propane and trilenediisocyanate, and an addition polymer of trimethylol propane and xylylenediisocyanate.

The crosslinked polymer layer of the polymer B can be formed on the composite reverse osmosis membrane by, for example, coating an aqueous solution or alcohol solution of polymer B on a composite reverse osmosis membrane, and heating the membrane to the dissociation temperature or above of the blocked isocyanate in order to free and crosslink the isocyanate groups, and the crosslink is at least one means selected from the group consisting of intramolecular link and intermolecular link.

And in order to accelerate the crosslinking reaction by the isocyanate groups and hydroxyl groups, catalysts like a tertiary amine or an organotin compound can be used if necessary during the crosslinking reaction.

Even if the organic compound does not have crosslinking functional groups, it is possible to create a radical on the framework of the organic polymer and to provide three-dimensional crosslinking. For this purpose, an electric beam can be irradiated on the composite reverse osmosis membrane after the positively-charged organic compound is coated thereon. Or a peroxide is mixed into the solution of the organic compound, and the solution is coated on a composite reverse osmosis membrane and heated.

It is preferable in this invention that the crosslinked polymer layer is usually 1 nm–10 μm thick. If the membrane is thinner than 1 nm, the desalination performance will not actually be improved even if the composite reverse osmosis membrane is used for the two-stage reverse osmosis system. On the other hand, a reverse osmosis membrane of thickness over 10 μm is not preferable since the water permeability of the membrane is greatly decreased.

When polyethylene imide is used as an organic polymer having positively-charged groups and glutaraldehyde is used as a crosslinking agent, a polyetheneimime crosslinked layer is formed by the reaction shown in the following Chemical Formula 1, Chemical Formula 1

The average molecular weight of the polyethylene amine used in this step is preferably at least 300. It is further preferable that the average molecular weight is at least 500. And it is also preferable that the polyethyleneimine crosslinked layer is 1 nm–10 μm thick.

Next, the highly permeable composite reverse osmosis membrane of this invention comprises a negatively-charged crosslinked polyamide type skin layer and a porous support to support the skin layer. The negatively-charged crosslinked polyamide type skin layer comprises a reaction product of a compound having at least two reactive amino groups and a polyfunctional acid halide compound having at least two reactive acid halide groups. The skin layer has an average surface roughness of at least 55 nm and is coated with a crosslinked layer of an organic polymer having positively-charged groups. By using the highly permeable composite reverse osmosis membrane in and after the second stage of the multi-stage reverse osmosis treatment, a reverse osmosis treatment can be conducted with superior desalination of mineral salts in the low concentration area and removal of cationic organic materials while keeping high water permeability. This membrane is useful, for example, as a membrane for the second stage of the two-stage reverse osmosis treatment (RO) which is conducted in the first half of an ultra-pure water producing line in connection with semiconductor manufacturing.

According to a preferable example of this method, multi-stage reverse osmosis treatment is conducted by using a composite reverse osmosis membrane before using the above-mentioned highly permeable composite reverse osmosis membrane. The composite reverse osmosis membrane comprises negatively-charged crosslinked polyamide type skin layer and a porous support to support the skin layer. The skin layer is formed by interfacial polycondensation of a compound having at least two reactive amino groups and a polyfunctional acid halide compound having at least two reactive acid halide groups. In the example, a negatively-charged membrane having high desalination is used for the first stage, and the liquid passes through another membrane in the second stage. The membrane of the second stage has a positively-charged groups, namely, different with respect to its ion from that of the first stage. Therefore, desalination performance is superior and ultra-pure water can be provided while keeping a high permeation flux.

According to the preferable example of the method in which the average surface roughness of the skin layer of the composite reverse osmosis membrane used in the pre-stage is at least 55 nm, a higher desalination property is realized and ultra-pure water can be produced while keeping a high permeation flux.

DETAILED DESCRIPTION OF THE INVENTION

This invention is described in detail by reference to the following examples and comparative examples, but the examples do not limit the scope of this invention.

Figure 1:
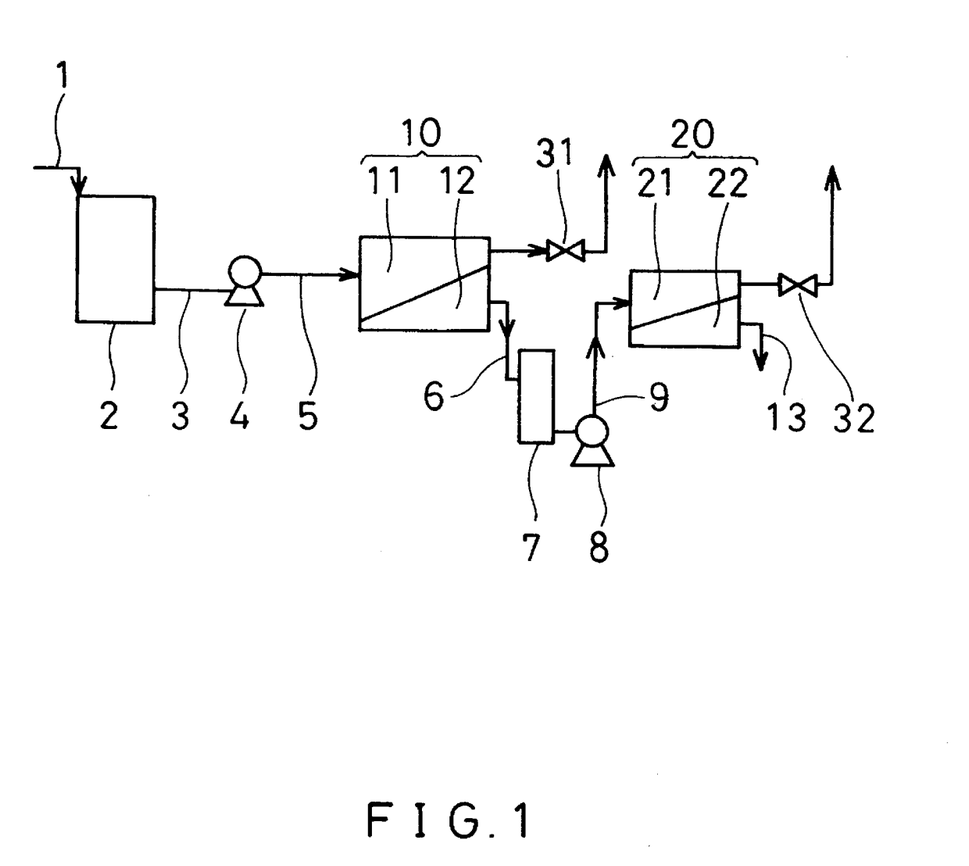
FIG. 1 shows a process of multi-stage reverse osmosis treatment used in this invention.

FIG. 1 shows an example of multi-stage reverse osmosis treatment processes conducted in this invention. In FIG. 1, number 1 is a supply line for raw liquid (raw water) like well water or water for industrial use. Number 2 is a tank to store the raw liquid (raw water). Number 3 is a transmission line to connect the tank 2 and a first transmission pump 4. Number 5 is a transmission line to connect the first transmission pump 4 and membrane module 10 of the first stage. Number 11 is a raw liquid chamber of the molecular module 10 for the first stage. Number 12 is a permeable chamber of the module 10. The raw liquid (raw water) can be filtered or treated biologically before the water reaches the supply line 1. A reverse osmosis membrane is provided between the raw liquid chamber 11 of the first stage membrane module 10 and the permeable chamber 12, so that the reverse osmosis treatment of the first stage is conducted. The first stage permeated liquid out of the permeable chamber 12 is transmitted to a transmission line 6. The liquid is stopped and stored at an intermediate tank or a storage means 7 like a pipe header to store a predetermined quantity of liquid. Then the liquid is passed through a transmission line 9 by using the second transmission pump 8, and reaches a membrane module 20 of the second stage. A reverse osmosis membrane of this invention is provided between a raw liquid chamber 21 of the membrane module 20 of the second stage and a permeable chamber 22, so that the second stage reverse osmosis treatment is conducted. The second stage permeated liquid (ultra-pure water) out of the permeable chamber 22 is taken out from the takeoff line 13. Number 31 is a pressure-control bulb which is provided at the exit side of the raw liquid chamber 11 of the membrane module 10 of the first stage. Number 32 is another pressure-control bulb which is provided at the exit side of the raw liquid chamber 21 of the membrane module 20 of the second stage. The operation pressures of the raw liquid chambers 11 and 21 are controlled with bulbs 31 and 32 respectively.

In this multi-stage reverse osmosis treatment process, it is preferable for an example of the membrane module 10 of the first state that a composite reverse osmosis membrane comprising negatively-charged crosslinked polyamide type skin layer and a porous support to support the skin layer be used. The skin layer is formed by interfacial polycondensation of a compound having at least two reactive amino groups and a polyfunctional acid halide compound having at least two reactive acid halide groups. And for the membrane module 20 of the second stage, a composite reverse osmosis membrane comprising a crosslinked polyamide type skin layer and a porous support to support the layer is used. The skin layer comprises a reaction product of a compound having at least two reactive amino groups and a polyfunctional acid halide compound having at least two reactive acid halide groups, and the average surface roughness of the skin layer is at least 55 nm. And the skin layer is coated with a crosslinked layer of an organic polymer having positively-charged groups, e.g., polyethyleneimine.

In the following Examples, the average roughness (Ra) defined by the Numerical Formula 1, the square average surface roughness (Rms) defined by the Numerical Formula 2, ten-points average surface roughness (Rz) defined by the Numerical Formula 3 and the maximum difference between peak and valley (PV) defined by the Numerical Formula 4 are calculated by the values measured by using an atomic force microscope (AFM). Average surface roughness is calculated by expanding to three-dimension in order that center line average surface roughness (Ra) which is defined in JIS B0601 is applicable to the measured face, so it is the average value of the absolute value of deviation of the reference face to the specified face. Here, the measured face is the face shown by all of the measured data. A designated part of the above-mentioned measured face becomes the specified face. The specified face is used to measure surface roughness. Reference face is expressed as $Z=Z_0$ when the average value of the height of the specified face is $Z_0$. Square average surface roughness (Rms) is calculated by expanding Pans to the cross-sectional curved line to three dimensions in the same way as Ra in order to apply to the measured face. Therefore, it is the square root of the average value of the root of the deviation from the reference face to the specified face. Ten-points average surface roughness (Rz) is calculated by expanding Rz defined in JIS B0601 to three dimensions. It is the difference between the average value of the elevations of the peaks from the highest to the fifth highest and the average of the elevations of the valleys from the lowest to the fifth lowest. The maximum difference from peak to valley (PV) is the difference in the specified face between the elevation of the highest peak ($Z_{max}$) and the elevation of the lowest valley ($Z_{min}$). The procedure of measurement is well known.

EXAMPLE 1

A layer of an aqueous solution was formed on a porous polysulfone supporting film by contacting the solution with the supporting film and removing extra solution. The solution contained 2.0 wt % of m-phenylenediamine, 0.15 wt % of sodium laurylsulfate, 2.0 wt % of triethylamine, 4.0 wt % of camphor sulfonic acid, and 20 wt % of isopropyl alcohol.

Then, a composite reverse osmosis membrane was obtained by contacting a hexane solution containing 0.15 wt % of trimesic acid chloride with the surface of the supporting film, and holding the film at 120° C. in a hot air dryer for 3 minutes so that a polymer thin film was formed on the supporting film.

The composite reverse osmosis membrane was washed in water and dried. Then the surface roughness Of the polyamide type skin layer of the composite reverse osmosis membrane was measured by AFM. The average surface roughness (Ra) defined by the Numerical Formula 1 was 87.1 nm, the square average surface roughness (Rms) defined by the Numerical Formula 2 was 105 nm, the ten-points average surface roughness (Rz) defined by the Numerical Formula 3 was 433 nm, and the maximum difference from peak to valley (PV) defined by the Numerical Formula 4 was 555 nm.

When the performance of the composite reverse osmosis membrane thus obtained was evaluated using an aqueous solution containing 1500 ppm of sodium chloride having pH of 6.5 at a pressure of 15 kg/cm, the salt rejection as determined by the electric conductivity of the permeated liquid was 99.7% and the permeation flux was 1.7 m$^3$/(m$^2$, day).

EXAMPLES 2–4, COMPARATIVE EXAMPLES 1, 2

In each example, a composite reverse osmosis membrane was obtained in the same way as shown in the Example 1 except that the concentration of isopropyl alcohol was varied. The results are shown in Table 1.

TABLE 1

|  | isopropyl alcohol (wt %) | solution B | | | | aqueous solution of NaCl (1500 ppm) | |
|---|---|---|---|---|---|---|---|
|  |  | Ra (nm) | Rms (nm) | Rz (nm) | PV (nm) | salt rejection (%) | permeation flux(m$^3$m/$^2$day) |
| Example 2 | 10 | 62.6 | 76.1 | 336 | 434 | 99.8 | 1.3 |
| Example 3 | 40 | 59.8 | 78.1 | 309 | 474 | 92.1 | 1.2 |
| Comparative Ex. 1 | 0 | 43.5 | 54.9 | 243 | 356 | 99.8 | 1 |
| Comparative Ex. 2 | 80 | 16.9 | 21.2 | 117 | 143 | 53.4 | 0.5 |

EXAMPLES 5

A layer of an aqueous solution was formed on a porous polysulfone supporting film by contacting the solution with the supporting film and removing extra solution. The solution contained 3.0 wt % of m-phenylenediamine, 0.15 wt % of sodium laurylsulfate, 3.0 wt % of triethylamine, 6.0 wt % of camphor sulfonic acid, and 10 wt % of isopropyl alcohol.

Then, a composite reverse osmosis membrane was obtained by contacting a hexane solution containing 0.20 wt % of trimesic acid chloride with the surface of the supporting film, and holding the film at 120° C. in a hot air dryer for 3 minutes so that a polymer thin film is formed on the supporting film.

A part of the composite reverse osmosis membrane was washed in water and dried. Then the surface roughness of the polyamide type skin layer of the composite reverse osmosis membrane was measured by AFM. Ra was 76.8 nm, Rms was 93 nm, Rz was 324 nm, and PV was 555 nm. Since isopropyl alcohol was added to the solution A, the surface form of the reverse osmosis membrane changed at the interfacial polycondensation reaction. If another compound having a solubility parameter of 8–14(cal/cm$^3$)$^{1/2}$ is present during the interfacial polycondensation reaction, the surface form of the reverse osmosis membrane changes as well.

Next, 1 wt % of polyethyleneimine was added to the supplied pure water, and a reverse osmosis treatment was conducted. Then, inside of the system was washed with water, and 1 wt % of glutaraldehyde was added to the supplied pure water, so that a positively-charged composite reverse osmosis membrane was obtained by treating and crosslinking polyethyleneimine (composite reverse osmosis membrane A).

Then, a layer of an aqueous solution was formed on a porous polysulfone supporting film by contacting the solution with the supporting film for a few seconds and removing extra solution. The solution contained 2.0 wt % of m-phenylenediamine, 0.25 wt % of sodium laurylsulfate, 2.0 wt % of triethylamine, and 4.0 wt % of camphor sulfonic acid.

Then, a composite reverse osmosis membrane was obtained by contacting a hexane solution containing 0.10 wt % of trimesic acid chloride and 0.15 wt % of isophthalic acid chloride with the surface of the supporting film, and holding the film at 120° C. in a hot air dryer for 3 minutes so that a polymer thin film is formed on the supporting film (a composite reverse osmosis membrane B). The surface roughness of the composite reverse osmosis membrane B was measured. Ra was 51 nm, Rms was 62 nm, Rz was 296 nm, and PV was 345 nm. The surface of the composite reverse osmosis membrane B was similar to that of the conventional reverse osmosis membrane.

Then, the property of the composite reverse osmosis membrane A was measured by using the process shown in FIG. 1. In the process, the composite reverse osmosis membrane B was used for the first stage, and the composite reverse osmosis membrane A was used for the second stage. The raw liquid was well water of pH 6.5 and whose electric conductivity was 100 μs/cm. The well water was transmitted to the composite reverse osmosis membrane B with 30 kgf/cm² of operation pressure and became the supplied water. And the property of the membrane A was measured at 15 kgf/cm² of operation pressure. The resistivity value was 9.9 MΨ.cm² and the permeation flux was 1.3 m³/(m².day). A continuous water-running test was carried out for 1000 hours maintaining the conditions. The resistivity value after 1000 hours was 9.9MΩ.cm², and the permeation flux was 14m³/(m², day), namely, the property did not deteriorated.

COMPARATIVE EXAMPLE 3

A composite reverse osmosis membrane C was attained from the composite reverse osmosis membrane B whose surface was the same as that of the conventional reverse osmosis membrane. The composite reverse osmosis membrane C was positively-charged like the membrane of Example 5. The property was examined as in the Example 5 in which the composite reverse osmosis membrane B was used for the first stage and the composite reverse osmosis membrane C was used for the second stage. The resistivity value was 9.0MΩ.cm², and the permeation flux was 0.7m³/(m².day). The permeation flux and the resistivity value were inferior to those of Example 5.

COMPARATIVE EXAMPLE 4

A membrane was prepared and examined in the same way of Example 5, except that the membrane was not treated with glutaraldehyde. The resistivity value was 9.8MΩ.cm², and the permeation flux was 1.3m³/(m².day). After 1000 hours of the continuous water-running test, the resistivity became 5.2MΩ.cm², and the permeation flux was 1.5m³/(m².day), namely the performance deteriorated.

As mentioned above, the composite reverse osmosis membrane of this invention is superior in desalination of mineral salts in a low concentration area and removal of cationic organic materials of multi-state reverse osmosis membranes system and others. The present composite reverse osmosis membrane also had higher permeability and durability.

Reference 1

Methyl ethyl ketoxime weighing 29 g was dissolved in 50 g of benzene. At a temperature of 25° C., 51.6 g of 2-methacroyl oxyethylene isocyanate was dropped into the solution in about 40 minutes. And the solution was stirred at 45° C. for 2 hours. The reacted product was analyzed by proton NMR, which confirmed that the product was a blocked substance in which methyl ethyl ketoxyme was attached almost quantitavely to 2-methacroyl oxyethylene isocyanate.

Reference 2

Methacrylate hydroxypropyl trimethyl ammonium chloride (16 g) and 8g of the blocked isocyanate compound of the reference 1 were dissolved into 60 g of methanol. Azobisiso butyronitrile (0.4 g) was added to this solution and the solution was stirred at 60° C. in an atmosphere of nitrogen for 6 hours. As a result, a copolymer having quaternary ammonium groups was obtained.

EXAMPLE 6

A layer of a solution A was formed on a porous polysulfone supporting film by contacting the solution A with the supporting film and removing extra solution A. The solution A contained 3.0 wt % of m-phenylenediamine, 0.15 wt % of sodium laurylsulfate, 3.0 wt % of triethylamine, 6.0 wt % of camphor sulfonic acid, and 10 wt % of isopropyl alcohol.

Then, a hexane solution containing 0.20 wt % of trimesic acid chloride (solution B) was provided on the supporting film so that the solution B contacted with the solution A. After that, the film was held in a hot air dryer at 120° C. for 3 minutes in order to form a polymer film on the supporting film. Thus a composite reverse osmosis membrane was obtained.

A part of the composite reverse osmosis membrane was washed in water and dried. Then, the surface roughness of the polyamide type skin layer of the composite reverse osmosis membrane was measured by AFM. Ra was 76.8 nm, Rms was 93 nm, Rz was 324 nm, and PV was 555 nm. Since isopropyl alcohols was added to the solution A, the surface form of the reverse osmosis membrane changed at the interfacial polycondensation reaction. If another compound having a solubility parameter of 8–14(cal/cm³)$^{1/2}$ is present during the interfacial polycondensation reaction, the surface form of the reverse osmosis membrane changes as well.

An aqueous solution of the copolymer obtained in the Reference 2 was prepared by dissolving the copolymer (lg) into water in order to form a 1 wt % solution. To this solution as a crosslinking catalyst, 1,4-azobicyclo(2,2,2)octane (0.005 g) was added. A positively-charged composite reverse osmosis membrane (composite reverse osmosis membrane C) was obtained by coating the solution on the composite reverse osmosis membrane, heating the membrane at 150° C. for 10 minutes, and crosslinking the copolymer.

Next, a layer of an aqueous solution A was formed on a porous polysulfone supporting film by contacting the solution A with the supporting film for a few seconds, and removing extra solution A. The solution A contained 2.0 wt % of m-phenylenediamine, 0.25 wt % of sodium laurylsulfate, 2.0 wt % of triethylamine, and 4.0 wt % of camphor sulfonic acid.

Then, another solution B, namely, a hexane solution containing 0.10 wt % of trimesic acid chloride and 0.15 wt % of isophthalic acid chloride was prepared. A composite reverse osmosis membrane D was obtained by contacting the solution B with the solution A on the supporting film, holding the film at 120° C. in a hot air dryer for 3 minutes in order to form a polymer film on the supporting film. The surface roughness of the composite reverse osmosis membrane D was measured. Ra was 51 nm, Rms was 62 nm, Rz was 296 nm, and PV was 345 nm. The surface of the composite reverse osmosis membrane D was similar to that of the conventional reverse osmosis membrane.

Then, the property of the composite reverse osmosis membrane D was measured by using the process shown in FIG. 1. In the process, the composite reverse osmosis membrane D was used for the first stage and the composite reverse osmosis membrane C was used for the second stage. The raw liquid was well water of pH 6.5 and its electric conductivity was 100 μs/cm. The well water was transmitted to the composite reverse osmosis membrane D with 30 kgf/cm$^2$ operation pressure and became the supplied water. The property of the membrane C was measured at 15 kgf/cm$^2$ of operation pressure. The resistivity value was 9.4MΩ.cm$^2$ and the permeation flux was 1.6m$^3$/(m$^2$.day).

COMPARATIVE EXAMPLE 5

A composite reverse osmosis membrane E was obtained from the composite reverse osmosis membrane D whose surface was as same as that of the conventional reverse osmosis membrane. The composite reverse osmosis membrane E was positively-charged like the membrane of Example 6. The composite reverse osmosis membrane D was used for the first stage and the composite reverse osmosis membrane E was used for the latter stage as in Example 5. The resistivity value was 7.7MΩ.cm$^2$ and the permeation flux was 0.9m$^3$/(m$^2$.day) The permeation flux and the resistivity value were inferior to those of Example 1.

As mentioned above, the composite reverse osmosis membrane of this invention is superior in desalination of mineral salt in a low concentration area and removal of cationic organic substances for multi-stage reverse osmosis membrane system and others. And the composite reverse osmosis membrane has higher permeability and durability.

This invention may be embodied in other forms without departing from the spirit or essential characteristics thereof. The embodiments disclosed in this application are to be considered in all respects as illustrative and not limitative, the scope for the invention is indicated by the appended claims rather than by the foregoing description, and all changes which come within the meaning and range of equivalency of the claims are intended to be embraced therein.

What is claimed is:

1. A highly permeable composite reverse osmosis membrane, comprising a polyamide skin layer comprising a reaction product of a compound having at least two reactive amino groups and a polyfunctional acid halide compound having at least two reactive acid halide groups, the membrane further comprising a porous support to support said polyamide skin layer, wherein the average surface roughness of said polyamide skin layer is at least 55 nm.

2. The highly permeable composite reverse osmosis membrane according to claim 1, wherein the square average surface roughness of the polyamide skin layer is at least 65 nm.

3. The highly permeable composite reverse osmosis membrane according to claim 1, wherein the ten-points average surface roughness of the polyamide skin layer is at least 300 nm.

4. The highly permeable composite reverse osmosis membrane according to claim 1, wherein the maximum difference between peak and valley of the polyamide skin layer is at least 400 nm.

5. The highly permeable composite reverse osmosis membrane according to claim 1, wherein the surface of the polyamide skin layer is further coated with a crosslinked layer of a positively-charged organic polymer.

6. The highly permeable composite reverse osmosis membrane according to claim 5, wherein the square average surface roughness of the polyamide skin layer is at least 65 nm.

7. The highly permeable composite reverse osmosis membrane according to claim 5, wherein the ten-points average surface roughness of the polyamide skin layer is at least 300 nm.

8. The highly permeable composite reverse osmosis membrane according to claim 5, wherein the maximum difference between peak and valley of the polyamide skin layer is at least 400 nm.

9. The highly permeable composite reverse osmosis membrane according to claim 5, wherein the crosslinked layer of the positively-charged organic polymer is a crosslinked polyethyleneimine.

10. The highly permeable composite reverse osmosis membrane according to claim 5, wherein the crosslinked layer of organic polymer having positively-charged groups is produced by crosslinking polymers having quaternary ammonium groups and hydroxyl groups, and the crosslinking is at least one means selected from the group consisting of intramolecular link and intermolecular link.

11. The highly permeable composite reverse osmosis membrane according to claim 5, wherein the crosslinked layer of the organic polymer having positively-charged groups is 1 nm to 10 μm thick.

12. A method of removing material from a liquid, comprising subjecting the liquid to treatments with a first reverse osmosis membrane and with a second reverse osmosis membrane after treatment with said first reverse osmosis membrane, wherein a highly permeable reverse osmosis membrane, comprising a negatively-charged crosslinked polyamide skin layer and a porous support for the skin layer, is used for a second reverse osmosis membrane, the skin layer comprising a reaction product of a compound having at least two reactive amino groups and a polyfunctional acid halide compound having at least two reactive acid halide groups and having an average surface roughness of at least 55 nm, the skin layer being coated with a crosslinked layer of an organic polymer having positively-charged groups.

13. The method according to claim 12, wherein the first comprises a negatively-charged crosslinked polyamide skin layer and a porous support for the skin layer, the skin layer comprising a reaction product of a compound having at least two reactive amino groups and a polyfunctional acid halide compound having at least two acid halide groups.

14. The method according to claim 13, wherein the skin layer of the first reverse osmosis membrane has an average surface roughness of at least 55 nm.

\* \* \* \* \*